United States Patent
Guichard et al.

(10) Patent No.: US 8,959,993 B2
(45) Date of Patent: Feb. 24, 2015

(54) DEVICE FOR DETERMINING AN AERODYNAMIC FLOW ALONG A WALL AND CONTROLLING A PROFILE OF THE WALL

(75) Inventors: Philippe Guichard, Chabeuil (FR); Philippe Rondeau, Allex (FR)

(73) Assignee: Thales, Neuilly sur Seine (FR)

( * ) Notice: Subject to any disclaimer, the term of this patent is extended or adjusted under 35 U.S.C. 154(b) by 549 days.

(21) Appl. No.: 13/263,834

(22) PCT Filed: Apr. 12, 2010

(86) PCT No.: PCT/EP2010/054775
§ 371 (c)(1),
(2), (4) Date: Mar. 5, 2012

(87) PCT Pub. No.: WO2010/116004
PCT Pub. Date: Oct. 14, 2010

(65) Prior Publication Data
US 2012/0186337 A1    Jul. 26, 2012

(30) Foreign Application Priority Data

Apr. 10, 2009 (FR) .................................... 09 01792

(51) Int. Cl.
*G01P 5/10* (2006.01)
*B64D 43/02* (2006.01)
(52) U.S. Cl.
CPC .. *G01P 5/10* (2013.01); *B64D 43/02* (2013.01)
USPC ..................................................... 73/170.12
(58) Field of Classification Search
None
See application file for complete search history.

(56) References Cited

U.S. PATENT DOCUMENTS

| | | | |
|---|---|---|---|
| 6,380,535 B1 | 4/2002 | Wetzel | |
| 6,431,010 B1 | 8/2002 | Joffe | |
| 6,826,493 B1 * | 11/2004 | Mangalam | 702/45 |
| 6,963,810 B2 * | 11/2005 | Mangalam | 702/45 |
| 2009/0050742 A1 * | 2/2009 | Bonnaud et al. | 244/129.1 |

FOREIGN PATENT DOCUMENTS

| | | |
|---|---|---|
| DE | 10 2006 041461 A1 | 3/2008 |
| GB | 2389902 A | 12/2003 |
| JP | 2005/172713 A | 6/2005 |
| WO | 2004/094961 A1 | 11/2004 |
| WO | 2005/022089 A2 | 3/2005 |
| WO | 2009/034385 A1 | 3/2009 |

OTHER PUBLICATIONS

DE102006041461 (A1), Wind Energy plant comprises measuring device, which has measruing element with fiber optic cable provided with optical sensor and electrical heating element, Patent translation (pp. 1-16); Mar. 20, 2008.*

* cited by examiner

*Primary Examiner* — Harshad R Patel
(74) *Attorney, Agent, or Firm* — Baker & Hostetler LLP (57) ABSTRACT

A device for characterizing the nature of an aerodynamic stream along a wall, the device including multiple temperature-sensitive optical nodes of Bragg grating type distributed along an optical fiber. The device determining the variations in speed of the aerodynamic stream. The nodes are distributed along a fiber placed substantially following the route of a streamline, and the device processing so as to differentiate the temporal and spatial characteristics of the signals of thermal flowrate among the nodes.

16 Claims, 5 Drawing Sheets

DEVICE FOR DETERMINING AN AERODYNAMIC FLOW ALONG A WALL AND CONTROLLING A PROFILE OF THE WALL

CROSS-REFERENCE TO RELATED APPLICATIONS

This application is a National Stage of International patent application PCT/EP2010/054775, filed on Apr. 12, 2010, which claims priority to foreign French patent application No. FR 09 01792, filed on Apr. 10, 2009, the disclosures of each of which are incorporated by reference in their entireties.

FIELD OF THE INVENTION

The invention relates to a device for characterizing the nature of an aerodynamic stream along a wall and a loop for controlling a profile of the wall.

The invention finds particular utility in the characterization of the aerodynamic stream at the surface of an airframe, in particular the wings of an aircraft. The knowledge of the zones where the flow is laminar, and then turbulent, of the zones of transition to a detachment of the streamlines, and of other characteristics such as shock waves are significant parameters in the piloting of the aircraft. A characterization device according to the invention is advantageously integrated into a loop for controlling these phenomena, with actuators making it possible to modify the profile of the wall. The actuators are arranged so as to act on the characteristics measured by the characterization device, so as to optimize the characteristics of the aircraft. In this case, the actuator control and command loop as a whole will make it possible to control certain aerodynamic or aeroelastic phenomena in the sense of protection of the aircraft, of lesser structural fatigue, and of fuel economy. Typically, this control loop is itself integrated into a wider loop integrating inertial measurements of motions.

BACKGROUND

Certain phenomena need to be identified essentially by their spatial distribution such as the nature of the flow, for example laminar on a part of the wing and turbulent on another part. The action on the actuators then makes it possible to render the flow as laminar as possible, thereby reducing the drag. A characterization device makes it possible to detect a boundary layer detachment, and therefore to actuate devices for countering this detachment. A characterization device also makes it possible to identify and to locate the recompression shock wave phenomena at the supersonic-subsonic transition.

Other phenomena may be identified essentially by their dynamic characteristics at a given point such as oscillations in aerodynamic pressure, well known in the literature by the name "buffeting", or phenomena of vibratory coupling between the aerodynamic forces and the elastic mechanical forces exerted on a wall that is not infinitely rigid. These coupling phenomena are charted by means of a characterization device used in combination with mechanical-load sensors, typically inertial or strain gauge sensors. These coupling phenomena are well known in the literature by the name "flutter". These dynamic phenomena are uncomfortable and sometimes dangerous, and risk diverging to the extent that the structure of the aircraft breaks.

The invention finds another utility in the characterization of the aerodynamic stream along a boat sail making it possible to propel it. The sails are trimmed so as to exhibit a hollow profile. It is known to adjust the profile of the sails notably by modifying the hollow by acting on the tension of halyards making it possible to hoist the sails home. Moreover, the nature of the air flow along the sails may be visualized by means of dog-vanes arranged on the sail either on the intrados or on the extrados. These are strands, for example of wool, intended to follow the flow. In laminar flow, these strands cling to the sail and in turbulent flow these strands ripple. The crew of the boat monitor these dog-vanes and adjust the profile of the sails to obtain the most laminar flow possible in order to limit the drag. The function of the dog-vanes is the same, in a simplified manner, as that of the invention: to ascertain the nature of the flow at places of interest, so as to act on this flow.

In the field of sports sailing, this type of adjustment has remained manual in that a man watches the dog-vanes and corrects at a limited tempo with respect to the local aerological variations related to gusts and to waves for example.

In aeronautics, shear sensors well known in the literature by the name "shear-stress sensors" have been used to measure the speed of an aerodynamic stream along a wall. These sensors use for example the thermal transfer between a heating element situated on the wall and the aerodynamic stream. The temperature of this heating element is servo controlled and the power dissipated by the heating element to obtain the setpoint temperature is representative of the speed of the flow of the aerodynamic stream along the wall. Indeed, the more significant the speed of the aerodynamic stream, the more the wall is cooled by the aerodynamic stream and therefore the more significant the heating power required in order to reach the setpoint temperature.

The heating element must be thermally decoupled as well as possible from the material of the wall itself, so as to maintain the bandwidth of the measurement. In order for there to be heat energy transfer, the element is heated to a temperature generally regulated to a stable value greater than that of the aerodynamic stream. The heating power is generally provided through the Joule effect. The temperature regulation is generally ensured by measuring the temperature, either via a thermosensitive element separate from the heating element, or via the resistance of the heating element itself, which varies as a function of temperature. A regulating device acts either on the supply voltage of the heating element, or on the duty ratio of a fixed-voltage modulation. Thus, the thermal power transferred from the aerodynamic stream to the element is directly proportional to the electrical power provided to the heating element. The thermal decoupling of the heating element with respect to the wall is significant so that the cooling of the heating element occurs predominantly through the aerodynamic stream and to a lesser degree through the wall itself.

This principle is found in hot-wire sensors, in hot-film sensors and in sensors produced on the basis of a hot-diaphragm micro-machined structure.

This type of node is incompatible with use on commercial aircraft during operation. Indeed, hot-wire devices are not nearly robust enough to be arranged on a wing in mass production. Moreover they are very sensitive to particulate depositions, particularly water. Finally, their integration into the skin of an aircraft wing while maintaining industrial simplicity of manufacture is not solved.

Hot-film devices exhibit the same robustness drawbacks. Moreover, the presence of electrical signals outside the aircraft poses the unsolved problem of electrical and radio-electric susceptibility, notably in relation to lightning.

Hot-diaphragm micro-machined devices do not impose any protuberance. Nonetheless, the radio-electric susceptibility and the cost of integration of multiple sensors in the skin of the aircraft are not solved.

For the record, mention will be made of the existence, for boundary layer characterization applications, of infrared camera-based laminar transition detectors, which are usable only within the context of in-flight trials. Indeed, heating is ensured by the sun or by a powerful source distributed in the skin. These detectors also are not robust enough for use in bulk. Moreover, these detectors have insufficient decoupling with the environmental temperature variations.

All these devices measure directly and without distinction the transmitted thermal power variation, be it related to a variation in aerodynamic stream, or to a variation in the temperature of this aerodynamic stream, or even directly of the sensitive element by solar radiation for example, or by ambient electromagnetic radiation.

There also exist shear sensors which do not rely on variations in thermal transfer, but on pressure variations. This principle is found in traditional pressure sensors, with communication with the exterior through a hole in the skin of the aircraft, and surface pressure sensors, generally piezoelectric, distributed in the form of a film containing a multitude of sensors.

Traditional pressure sensors exhibit the major drawback of requiring a hole for communication with the exterior. This hole is subject to obstruction and therefore application during operations is compromised. The complexity of integrating a large number of pressure sensors under the skin of the aircraft is also a major drawback.

Arrays of pressure sensors distributed at the surface have the same drawbacks as hot films.

All these devices measure directly and without distinction all the pressure variations, be they related to a variation due to the local intrinsic characteristics of the stream in the boundary layer, in immediate proximity to the wall, or to acoustic noise of more distant origin, or even directly transmitted by the structure for accommodating the sensors, that is to say the wall.

All these devices therefore exhibit the drawback of insufficient decoupling with the environmental pressure variations.

These characterization devices make it possible, by means of local measurement of mean speed of the aerodynamic stream traveling along the wall, to characterize the type of flow but do not take account of the dynamic phenomena mentioned above.

There also exist numerous sensors for measuring speed or flowrate of a fluid traveling through a pipeline or along a wall. One finds sensors implementing principles described above such as hot-film sensors and hot-diaphragm micro-machined sensors.

There also exist optical fiber sensors of Bragg grating type, well known in the literature by the name "Fiber Bragg Grating". The latter type of node has been known since 1978; the principle and embodiments thereof will be found in the following publication: Hill, K. O. (1978). "Photosensitivity in optical fiber waveguides: application to reflection fiber fabrication". Appl. Phys. Lett. 32, 647.

Speed or flowrate optical sensors such as these have also been described and used to measure the speed of the aerodynamic stream, its temperature, or the flowrate of a pipeline for example. Such descriptions will be found, by way of example, in the documents: GB 2 389 902, DE 10 2006 04261, U.S. Pat. No. 6,431,010, WO 2004/094961, JP 2005/172713.

Sensors for measuring speed or flowrate, based on optical principles, do not carry out any characterization of the nature of the stream. More generally, they deal only with the mean speed or with the mean flowrate and would not make it possible to identify dynamic phenomena.

SUMMARY

The invention is aimed at alleviating the defects of the devices described previously by proposing a complete device for characterizing the nature of an aerodynamic flow, that is to say not only allowing the location of the places at which the flow is laminar, turbulent, and the transition zones but also allowing the identification of dynamic phenomena in the neighborhood of the wall.

The invention is also aimed at sufficiently decoupling the measurement of the thermal, mechanical, acoustic, electromagnetic and luminous environment, and at facilitating the manufacture of the characterization device and its integration into an accommodating wall. The invention is aimed finally at rendering the characterization device robust to the chosen environment and obtaining minimum maintenance cost.

For this purpose, the subject of the invention is a device for characterizing the nature of an aerodynamic stream along a wall, characterized in that it comprises:
   a plurality of temperature-sensitive optical nodes distributed along an optical fiber, each node comprising an element heating the wall and an element sensitive to the temperature of the wall,
   a generator supplying the heating element of each of the nodes,
   and processing means making it possible:
      to determine for each node variations in speed of the aerodynamic stream as a function of the power emitted by the generator in order to supply the heating element and of a temperature measured by the sensitive element,
      to differentiate temporal and spatial characteristics of the speed variations of the stream at the various nodes and
      to compare the temporal and spatial characteristics with predefined models.

The sensitivity to temperature and to temperature variations in the class of optical fiber sensors is exploited. The capacity of this technology to arrange several sensor zones delimited along one and the same fiber is also exploited.

The device which measures a heat transfer, and not simply a temperature, allows decoupling with respect to the thermal environment of each node, the device being optimized for thermal measurement. The device does not comprise any elongation amplifier like optical pressure sensors. It is very insensitive to pressure and to pressure vibrations. The device being completely optical, it has no electromagnetic sensitivity to radio frequencies. As the device uses the laser principle, it is not sensitive to the optical environment.

With respect to optical sensors, the invention is characterized by its means allowing the measurement of fast variations in the temperature, which represent fast variations in the thermal flux between the wall and the aerodynamic stream in motion, which represent, finally, the fast variations in speed of the aerodynamic stream in extreme proximity to the wall, that is to say at the base of the boundary layer, and by the method for processing the information regarding fast variations, so as to deliver an item of information regarding the nature of the flow and the location if appropriate of the transitions between the various modes of flow. Indeed, the known optical sensors are not intended for this purpose, on account of inadequate signal processing and bandwidth.

In the field of sports sailing, it is possible to arrange the optical fiber along which the nodes are positioned on certain semi-rigid elements of the sails such as battens customarily used to stiffen the sails.

The subject of the invention is also a loop for controlling a profile of the wall, characterized in that it comprises a device for characterizing the nature of an aerodynamic stream along a wall according to the invention and at least one actuator making it possible to modify the profile of the wall as a function of the temporal and spatial characteristics of the speed variations of the stream at the various nodes so as to modify these variations.

Advantageously, for each node, the heating element comprises an optical fiber conducting luminous radiation toward the wall to heat it and the sensitive element comprises an optical fiber which integrates a Bragg grating which is able to alter radiation conducted by the optical fiber of the sensitive element, the alteration being dependent on the temperature of the wall.

By implementing optical fibers, both for heating the node and for temperature measurement, it is made possible to circumvent any item of electrical information and thus to improve the robustness of the node in relation to the electromagnetic environment.

The system can also be characterized in that a single optical fiber conducts the luminous flux making it possible to heat the walls of the various nodes and in that the optical fiber common to the various heating elements is curved at each sensor, the curvature making it possible to diffuse a part of the luminous flux toward each node. The heating system can also be produced by doping the fiber located at the spot where it is desired to dissipate heat, so as to absorb infrared radiation emitted at an end, in a known manner.

BRIEF DESCRIPTION OF THE DRAWINGS

The invention will be better understood and other advantages will become apparent on reading the detailed description of an embodiment given by way of example, this description being illustrated by the appended drawing in which.

For the sake of clarity, the same elements will bear the same references in the various figures.

DETAILED DESCRIPTION

The invention is described in relation to a device on board an aircraft but of course it may be implemented in other applications such as boat sails for example.

Figure 1:
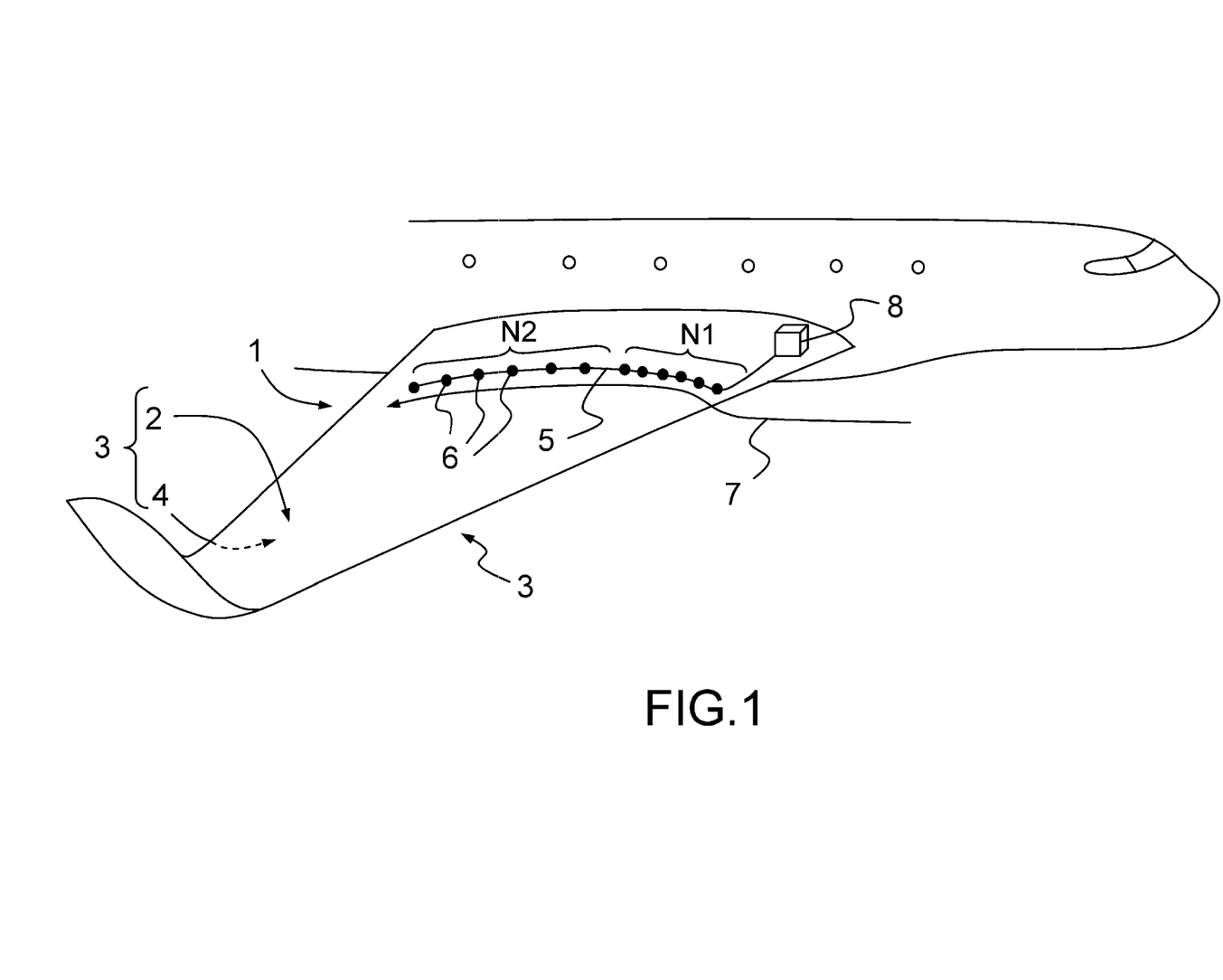
FIG. 1 schematically represents a characterization device according to the invention, the device comprising several optical nodes distributed along an optical fiber.

FIG. 1 represents a characterization device 1 arranged on the topside 2 of a wing 3 of an aircraft. It is of course possible to fit the characterization device 1 on the underside 4 of the wing 3, or at some other spot of interest, such as a lifting surface—fuselage junction zone, or else around an engine nacelle, or the empennage itself. The device 1 comprises an optical fiber 5 along which are arranged optical nodes 6. The optical fiber is placed on the topside 2 forming a wall along which one seeks to characterize the aerodynamic stream traveling thereat. The optical fiber 5 is placed on the wall 2 substantially according to a forecast route of a streamline 7 of the aerodynamic stream.

This embodiment is very suitable for a wall made of composite material. The optical fiber 5 is embedded in the wall 2 and the optical nodes 6 are flush with the surface of the wall 2.

The device also comprises a computer 8 making it possible to carry out the characterization as a function of information received by each of the optical nodes 6. The computer is for example arranged inside the fuselage of the aircraft. The computer 8 determines variations in speed of the aerodynamic stream locally at each optical node 6.

The speed variations are compared with predefined thresholds making it possible to characterize the flow. The thresholds are for example defined in a wind tunnel and then refined during in-flight trials.

For example, to define a first zone where the aerodynamic stream is laminar and a second zone where the aerodynamic stream is turbulent, the processing means 8 compare the stream speeds measured by the various nodes 6, so as to differentiate the mean amplitude and the amplitude of the variations in speed, that may be called noise in the speed, of stream of a first group N1 of nodes 6 with a second group N2 of nodes 6 with respect to predetermined thresholds of difference of mean amplitude and of speed variation. The processing means 8 thereafter determine a transition zone situated between the two groups N1 and N2. It has been found that the zone of transition between the two regimes, laminar and turbulent, is particularly disturbed and produces more significant speed variations than in the zones where the regimes are established as a laminar gradient. By determining the speed variations, or noise in the speeds, and not just the mean speeds, it is made possible to properly identify said laminar and turbulent zones and the transition zone.

Advantageously, the processing means 8 compare the stream speeds measured by the various nodes 6, in a spectrum ranging from the continuous up to a given frequency, with signals of known spectrum. The comparison spectrum can for example extend up to a frequency of the order of 1 to 10 kHz. In practice the frequency band depends on the Reynolds number and on other parameters specific to each application, from a few Hertz to several kilohertz. This frequency analysis makes it possible to easily identify signals characteristic of laminar, turbulent, detached flows and of zone of transition between laminar, turbulent, and detached flows. The known spectrum signals are defined by in-flight trials.

The frequency analysis can also make it possible to identify signals characteristic of recompression shock wave phenomena at the supersonic-subsonic transition and/or signals characteristic of phenomena of buffeting and of flutter.

Figure 2:
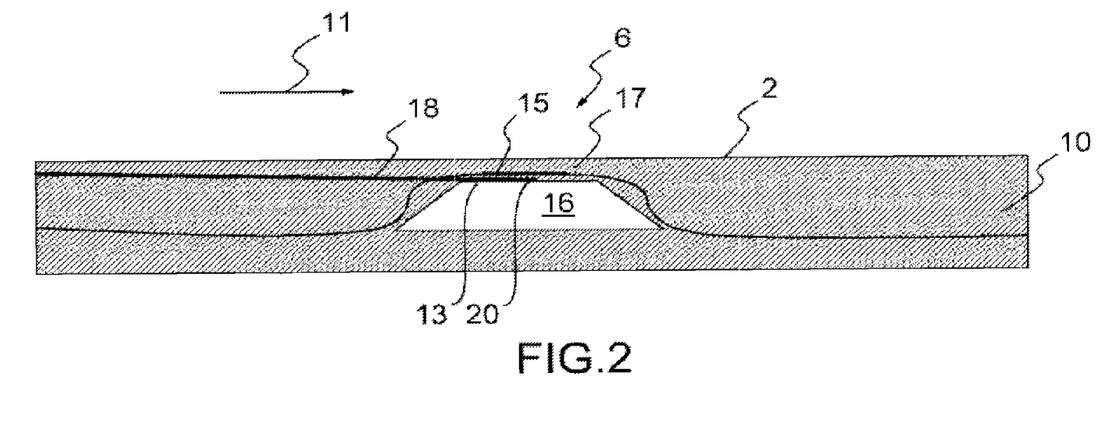
FIG. 2 schematically represents an exemplary optical node according to the invention.

FIG. 2 represents a solid body 10 along which the aerodynamic stream is traveling. The direction of travel of the aerodynamic stream along the body 10 is represented by an arrow 11 forming the direction of the streamline 7. A node 6 making it possible to measure the speed of the aerodynamic stream along the body 10 has been arranged inside the body 10.

The principle of speed measurement is that of a thermal shear sensor as mentioned above. The node 6 comprises a heating element 13 making it possible to heat the wall 2 of the body 10. The aerodynamic stream tends to cool the wall 2 by convection. The node 6 also comprises an element 15 sensitive to the temperature of the wall 2. The more significant the speed of the aerodynamic stream, the stronger the convection and the lower the temperature of the wall 2, measured by the sensitive element 15. Consequently, the temperature information gathered by the sensitive element 15 is representative of the speed of the aerodynamic stream along the wall 2.

Several nodes 6 can be arranged on the topside 2 between the leading edge and the trailing edge so as to ascertain the nature (laminar or turbulent) of the flow along the wing. Indeed, laminar flow of the air induces less drag by friction. Moreover, the thermal flux dissipated by convection from the wing to the air is related to the speed of the air in immediate proximity to the wing, that is to say inside the boundary layer of the air flow along the wall 2. The convection is much more significant in the turbulent regime than in the laminar regime. Such a node therefore makes it possible to determine the nature of the regime of the air stream and of course the node 6 makes it possible to detect a possible transition between the two regimes. The transition between the regimes and the regimes themselves are discernable not only by comparison of the value of the thermal transfer in its continuous component, but also by the dynamic characteristics of the signal representing the instantaneous value of the thermal transfer.

It is sought to limit to the maximum the thermal transfer between the heating element 13 and the solid body 10 so as to favor thermal transfer toward the aerodynamic stream. For this purpose, a cavity 16 closed by a skin 17 forming the wall 2 at the node 6 has been produced in the solid element 10. The skin 17 is slender so as to limit the heat capacity of the body 10 locally at the node 6.

In a preferential embodiment, the skin 17 and the body 10 are in fact parts of a composite material cladding, working or otherwise.

According to the invention, the heating element 13 comprises an optical fiber 18 conducting a luminous flux toward the wall 2 so as to heat it. Moreover, the sensitive element 15 of each node 6 comprises a Bragg grating which is able to alter radiation conducted by the optical fiber 5, the alteration being dependent on the temperature of the wall 2. More precisely, by introducing a Bragg grating into the optical fiber 5, it is made possible to reflect luminous radiation conducted by the latter at a precise wavelength. Temperature variations deform the Bragg grating, thereby causing a modification of the reflected wavelength. By measuring the wavelength reflected by the Bragg grating, an image of the temperature of the sensitive element 15 is obtained. The Bragg grating remains transparent to the other wavelengths, thereby making it possible to produce several sensitive elements on one and the same optical fiber 5.

In a first embodiment represented in FIG. 2, the optical fiber 18 extends along the wall 2, that is to say parallel to the latter, embedded in the skin 17. The optical fiber 18 comprises an end 20 situated in immediate proximity to the sensitive element 15. The end 20 is arranged substantially at the center of the sensitive element 15. Luminous radiation is conducted by the optical fiber 18 up to the end 20. This luminous radiation conveys thermal energy sufficient to heat the skin 17.

Advantageously, the wall 2 comprises a material diffusing the luminous radiation emitted by the optical fiber 18. This luminous radiation is for example infrared. It may be emitted by a laser or by a lamp. To diffuse this type of radiation it is for example possible to produce the skin 17 from carbon fiber embedded in an epoxy or carbon resin.

In a second embodiment, the optical fiber 18, at its end 20, is substantially perpendicular to the wall 2. The end 20 is for example arranged in the cavity 16 so as to illuminate the skin 17.

In these two embodiments, but advantageously for the second, it is possible to concentrate the emission of heat at the exterior face of the skin 17, this face being in contact with the aerodynamic stream. For this purpose, the wall 2 comprises a material transparent to the luminous radiation emitted by the optical fiber 18. The transparent material is covered with the diffusing material at the interface between the wall 2 and the medium in which the aerodynamic stream is traveling.

Figure 3:
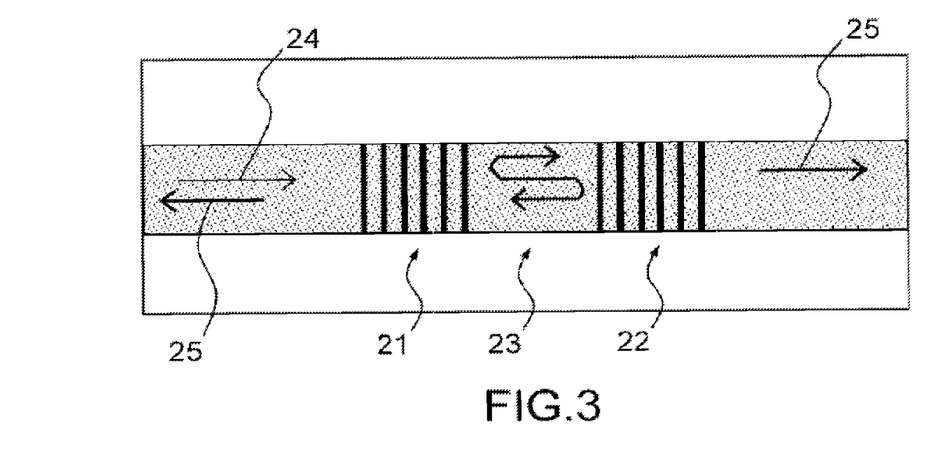
FIG. 3 represents an exemplary sensitive element belonging to an optical node according to the invention.

FIG. 3 represents a variant embodiment of the sensitive element 15 which comprises two Bragg gratings 21 and 22 flanking a resonant cavity 23 whose resonant wavelength is dependent on the temperature of the wall 2. The cavity 23 is for example doped with erbium. The atoms therein are excited by optical pumping radiation 24. The cavity 23 emits laser radiation 25 whose wavelength is dependent on the temperature of the sensitive element 15 on account of the variation in optical length of the cavity 23 due to the thermal expansion of the materials forming the sensitive element 15. This type of sensitive element has been used as pressure node in a hydrophone as described in an article by David J. Hill et al "Fiber laser hydrophone array" Proc. SPIE vol. 3860, pages 55 to 66 (September 19599). The sensitive element 15 is integrated into the optical fiber 5. (This document has been referenced XP003013266 by the European Patent Office.)

Figure 4:
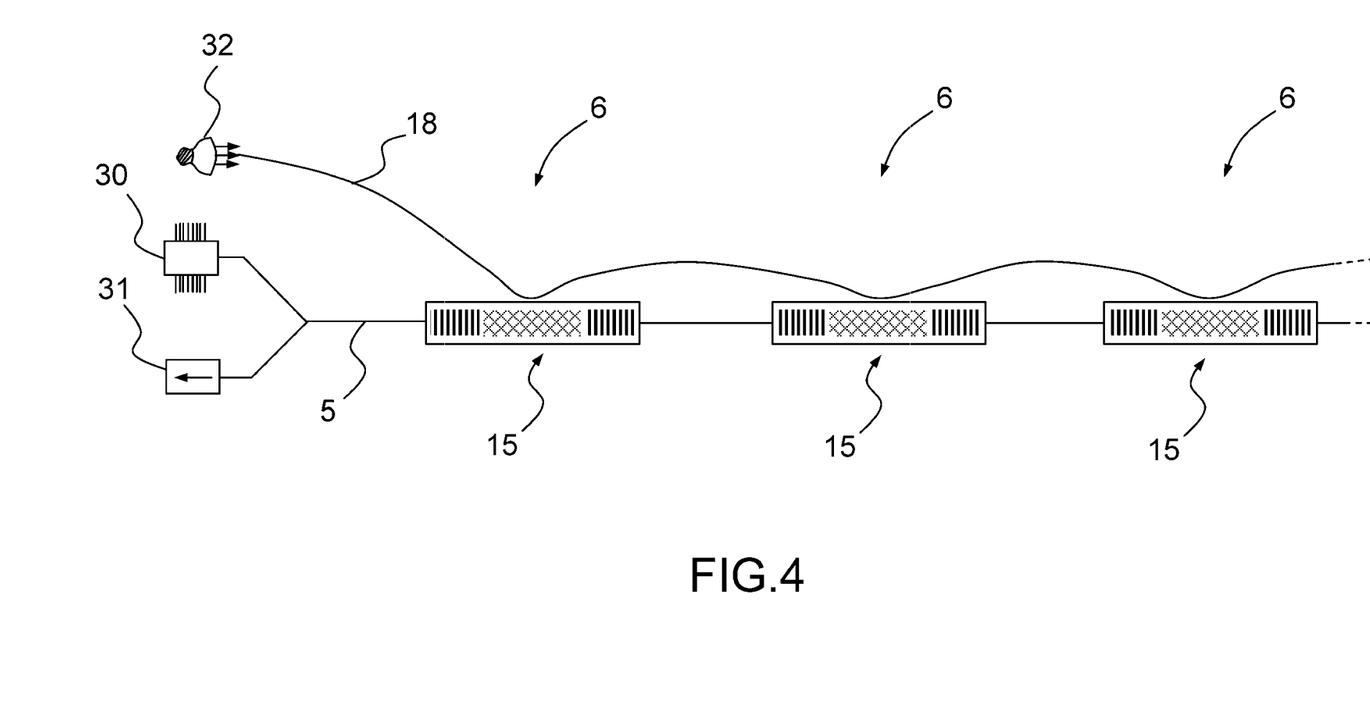
FIG. 4 represents a system comprising several nodes.

FIG. 4 represents the device with several nodes. The optical fiber 5 is common to the sensitive elements 15 of the various nodes 6. A pump laser 30 emits radiation stimulating the various sensitive elements 15. The radiation emitted by each sensitive element 15 is centered around a particular wavelength so as to be able to distinguish them. An optical isolator 31 makes it possible to recover the radiations emitted by the various sensitive elements so as to determine the temperature of each.

In the system of FIG. 4, it is also possible to implement a single optical fiber 18 common to all the nodes 6 in order to heat the wall 2. The optical fiber 18 is illuminated by a luminous source 32 for example infrared. The optical fiber 18 is curved at each node 6. The curvature of the optical fiber 18 makes it possible to diffuse part of the luminous flux emitted by the source 32 toward each node 6. It is of course possible to heat the wall 2 at each node 6 by means of an optical fiber 18 specific to each node 6. The optical fibers 18 and 5 are embedded in the skin 17 of each node 6 and more generally in the wall 2 between each node 6.

The integration of a fiber for measuring 5 and for generating heat 18 in a wall 2, in particular in a composite material wall, is easy to carry out. Once integrated, two fibers, with their connectors, ensure the function of an assembly of numerous sensors, typically from 10 to 100, distributed along the fibers. The integration is therefore infinitely simpler than that of the same number of electrical sensors, which moreover must benefit from electromagnetic shielding.

Advantageously, the device comprises a generator, as the luminous source 32, supplying the heating element 13 as a function of a setpoint, means for modulating the setpoint at a given frequency and means for demodulating the temperature measured by the sensitive element 15, the demodulation being synchronous with the modulation.

Indeed, the conservation of heat at the node 6 may be modeled in the following manner $$C\frac{dT(t)}{dt} = \lambda(t) \cdot (T_{ext}(t) - T(t)) + P(t) \qquad (1)$$

In equation (1), the sensitive element 15 is at a time-dependent temperature T: T(t). The sensitive element 15 is embedded in the skin 17 of heat capacity: C. The node 6 exhibits a time-dependent thermal conductivity: $\lambda(t)$ with respect to the aerodynamic stream whose heat capacity is considered to be infinite. The heating element 13 feeds the node 6 with a time-dependent thermal power: P(t). The temperature of the aerodynamic stream is denoted: $T_{ext}(t)$.

By integrating equation (1) we obtain:

$$T(t) = e^{-\int \frac{\lambda(t)}{C} dt} \cdot \left( B + \int \frac{\lambda(t) \cdot T_{ext}(t) + P(t)}{C} \cdot e^{\int \frac{\lambda(t)}{C} dt} dt \right) \qquad (2)$$

In equation (2), B represents a coefficient that can be determined by the boundary conditions.

In the case where the thermal conductivity $\lambda(t)$, the thermal power P(t) and the exterior temperature $T_{ext}(t)$ vary very slowly or are constant, the temperature of the node is obtained as:

$$T(t) = Be^{-\frac{\lambda}{C}t} + T_{ext} + \frac{P}{\lambda} \qquad (3)$$
$$= T_0 e^{-\frac{\lambda}{C}t} + (1 - e^{-\frac{\lambda}{C}t})T_{ext} + (1 - e^{-\frac{\lambda}{C}t})\frac{P}{\lambda}$$

It is seen that, in this case, the equilibrium temperature $T(\infty)$ of the node (6) is $$T(\infty) = T_{ext} + \frac{P}{\lambda} \qquad (4)$$

The equilibrium temperature $T(\infty)$ depends on the temperature of the exterior medium $T_{ext}$ and the thermal conductivity $\lambda$ that it is desired to measure. Thus to obtain the thermal conductivity $\lambda$, it is necessary to perform a measurement of the temperature of the exterior medium.

It is possible to modulate the power fed P(t) to the node 6 for example according to a sinusoidal modulation:

$$P(t) = P_0 + P\cos(\omega t) \qquad (5)$$

In this modulation, $P_0$ is a mean power defined in such a way that the power P(t) is always positive, P is the half-amplitude of the power P(t) and $\omega$ an angular frequency of the power P(t). Other types of modulations are of course possible. It is possible to preserve a constant angular frequency $\omega$ and choose a different waveform from the sinusoidal form. It is also possible to vary the angular frequency $\omega$ so as to improve the robustness of the measurement with respect to the exterior disturbances. This type of angular frequency variation is known in the literature as "chirp".

Hereinafter and to simplify understanding, only a sinusoidal modulation is dealt with. The same type of reasoning can be used in respect of other modulations. The temperature T(t) of the sensitive element 15 is then expressed:

$$T(t) = Be^{-\frac{\lambda}{C}t} + T_{ext} + \frac{P_0}{\lambda} + \frac{CP}{\lambda} \frac{\cos\left(\omega t - \arctan\left(\frac{C\omega}{\lambda}\right)\right)}{\sqrt{1 + \frac{C^2\omega^2}{\lambda^2}}} \qquad (6)$$

It is seen here that the temperature variation T(t) obtained at the node 6 now depends only on parameters that are controllable or characteristic of the measurement configuration.

Thus, if a filter is applied to the variations in temperatures observed by the sensitive element 15 so as to look at only a certain bandwidth around the modulation frequency, the measurement becomes insensitive to all the exterior disturbances outside of this analysis band, consequently increasing the precision of the measurement performed.

Advantageously, the generator is utilized as the luminous source 32 and supplies the heating element 13 under pulse width modulation at a frequency greater than the modulation frequency so as to decouple the two modulations. It is for example possible to have a ratio of 10 between the two frequencies. Thus, during demodulation, any temperature variations measured by the sensitive element 15 at the pulse width modulation frequency will disappear.

The instantaneous speed of the aerodynamic stream may be determined on the basis of the amplitude of the demodulated instantaneous temperature T(t). A correspondence between amplitude of the thermal variations and the variations in speed of the aerodynamic stream is established for example in an empirical manner.

It is also possible to use the phase delay between the measured temperature and the variations in the heating power P(t) to perform the measurement. This phase shift measurement exhibits the benefit of being independent of the amplitude of the modulation of the heating power, rendering the measurement yet more robust. The variations in speed of the aerodynamic stream may be determined on the basis of the changes in the phase shift of the demodulated instantaneous temperature T(t) with respect to the setpoint modulated in terms of power P(t). In this variant it is also possible to establish a correspondence between phase shift value and speed of the aerodynamic stream.

Figure 5:
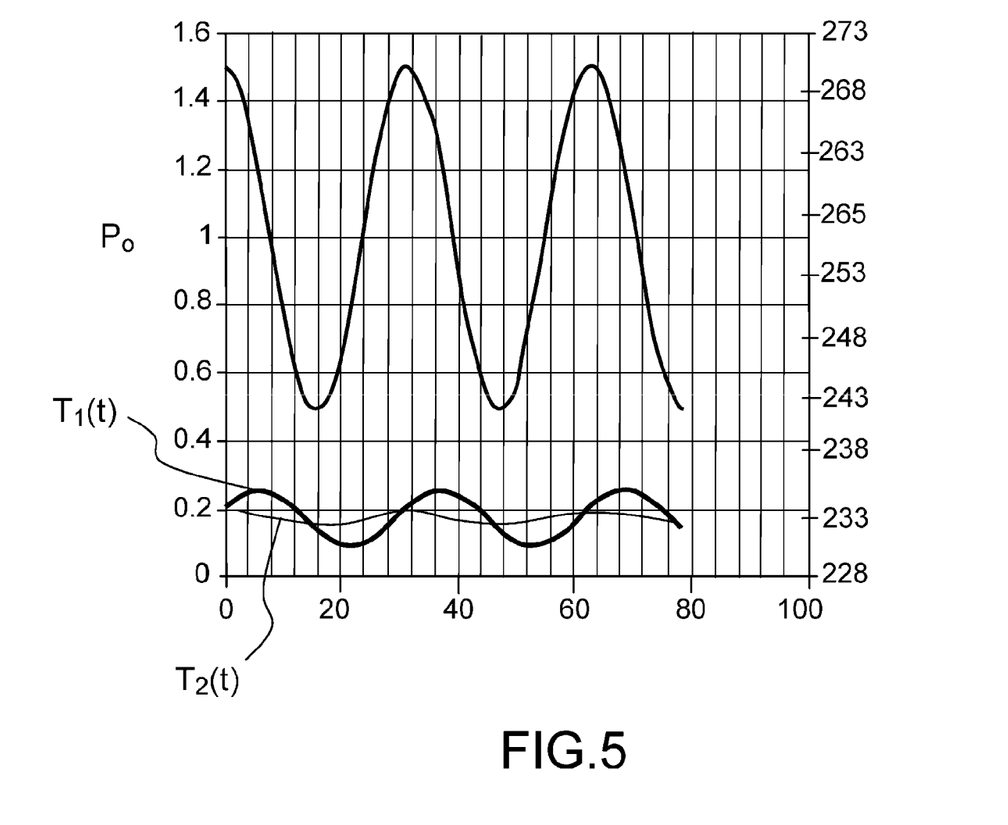
FIG. 5 represents in timechart form an example of modulation of power supplying a heating element of the node as well as examples of measurements of temperatures logged by the sensitive element of the node.

FIG. 5 represents in timechart form an example of modulation of power P(t) supplying the heating element 13. The mean power $P_0$ is normalized to a value of 1 represented along the ordinate on the left in FIG. 5. The modulation is sinusoidal here. Two examples of measurements of temperatures $T_{1(t)}$ and $T_{2(t)}$ logged by the sensitive element 15 are also represented in FIG. 4. More precisely, the curves $T_{1(t)}$ and $T_{2(t)}$ are represented after demodulation. The temperature values are expressed in kelvin and the temperature scale is represented along the ordinate on the right in FIG. 4. The curve $T_{1(t)}$ is logged for a node 6 whose thermal conductivity $\lambda$ is lower than the node associated with the curve $T_{2(t)}$. It is possible to establish a correspondence between the speed of the aerodynamic stream along the wall 2 and either the amplitude of the measured curve $T_{1(t)}$ or $T_{2(t)}$ or the phase shift between one of the curves $T_{1(t)}$ or $T_{2(t)}$ and the curve representing the power modulation P(t).

A device according to the invention is advantageously integrated into a loop for controlling a profile of a wall. The loop comprises actuators making it possible to modify the profile of the wall as a function of the temporal and spatial characteristics of the speed variations of the stream at the various nodes so as to modify these variations, for example to reduce the zones of turbulent or detached flow.

Figure 6:
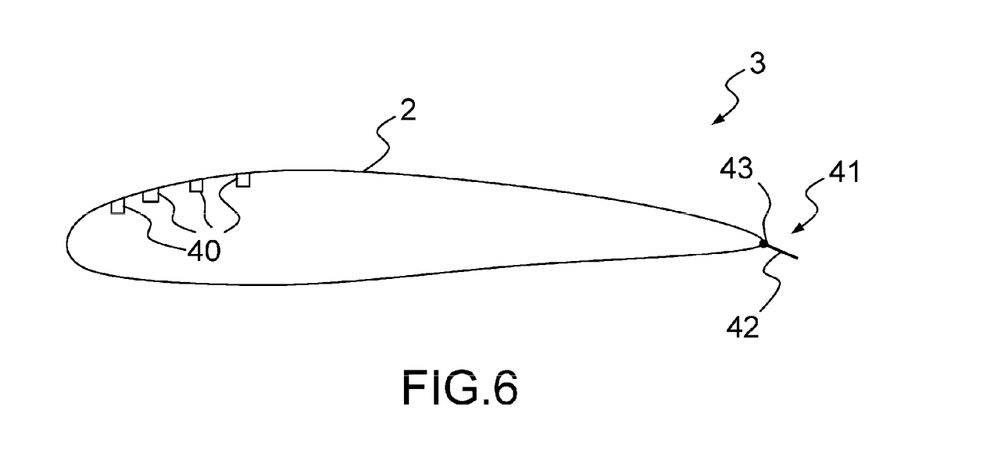
FIG. 6 represents in section through a vertical plane an aircraft wing comprising actuators making it possible to modify the profile of the wall of the wing.

FIG. 6 represents in section through a vertical plane an aircraft wing 3 comprising actuators making it possible to modify the profile of the wall 2 of the wing 3. The actuators are driven by the computer 8.

In FIG. 6, a first series of actuators 40 formed of micro-rams arranged inside the wing 3 makes it possible to modify the shape of the wall 2. These micro-rams are for example piezoelectric. In FIG. 6, several actuators 40 are arranged on the underside of the wing 3. Other positions are of course possible as a function of the requirement to correct the aerodynamic stream around the wall 2.

A second series of actuators 41 is formed of small flaps 42 arranged along the trailing edge 43 of the wing 3L. The flaps 42 are controlled in rotation about an axis substantially following the trailing edge 43.

Figure 7:
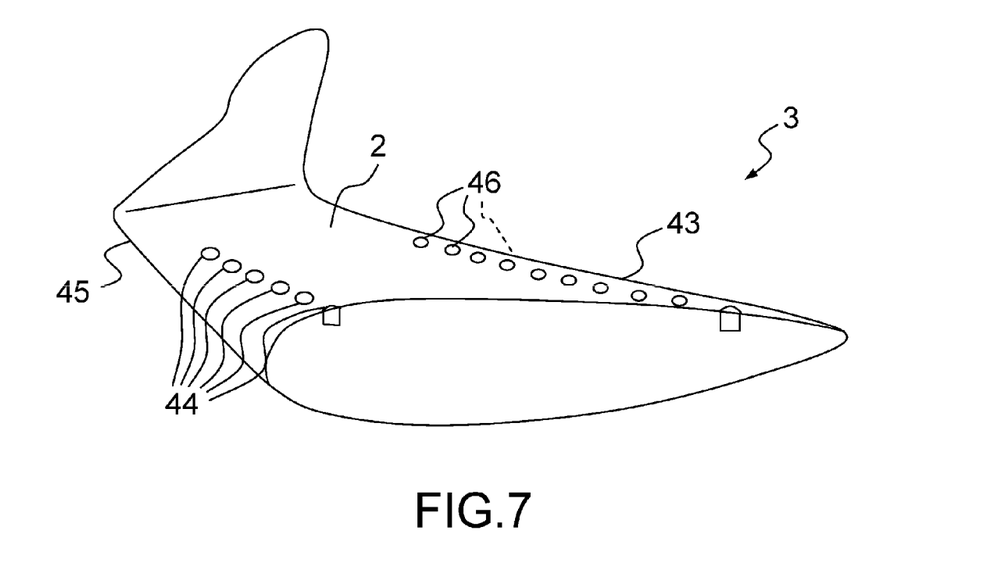
FIG. 7 represents in perspective an aircraft wing comprising several fluidic actuators.

FIG. 7 represents in perspective the wing 3 comprising several fluidic actuators. These actuators are formed of openings through which air jets may be emitted toward the exterior of the wall 2 so as to modify the aerodynamic stream around the wall 2.

In FIG. 7 a first series of fluidic actuators 44 is arranged in the neighborhood of the leading edge 45 of the wing 3 and a second series of fluidic actuators 46 is arranged in the neighborhood of the trailing edge 43 of the wing 3.

The invention claimed is:

1. A device to determine characteristics of an aerodynamic stream along a wall, the device comprising:
    a plurality of temperature-sensitive optical nodes distributed along an optical fiber, each node comprising an element heating the wall and an element sensitive to the temperature of the wall;
    a generator supplying power to the heating element of each of the nodes; and
    processing means configured to:
        determine for each node variations in speed of the aerodynamic stream as a function of the power supplied by the generator to supply the heating element with power and of a temperature measured by the element sensitive to the temperature of the wall,
        differentiate temporal and spatial characteristics of the speed variations of the stream at the various nodes, and
        compare the temporal and spatial characteristics with predefined data in order to determine characteristics of the aerodynamic stream.

2. The device according to claim 1, wherein the nodes are distributed along a fiber placed substantially on the wall following a forecast route of a streamline of the aerodynamic stream.

3. The device according to claim 1, wherein the processing means is further configured to compare the stream speeds measured by the various nodes to differentiate a mean amplitude of thermal flowrate of a first group of nodes with a second group of nodes with respect to a predetermined difference threshold, and determine a transition zone situated between the two groups.

4. The device according to claim 1, wherein the processing means is further configured to compare the stream speeds measured by the various nodes in a spectrum ranging from continuous comparisons up to a given frequency with signals of known spectrum to identify signals characteristic of laminar, turbulent, detached flows and of zone of transition between said laminar, turbulent and detached flows.

5. The device according to claim 1, wherein the processing means is further configured to compare the stream speeds measured by the various nodes in a spectrum ranging from continuous comparisons up to a given frequency with signals of known spectrum to identify signals characteristic of recompression shock wave phenomena at a supersonic-subsonic transition.

6. The device according to claim 1, wherein the processing means is further configured to compare the stream speeds measured by the various nodes in a spectrum ranging from continuous comparisons up to a given frequency with signals of known spectrum to identify signals characteristic of phenomena of buffeting and of flutter.

7. The device according to claim 1, wherein the sensitive element of each node comprises at least one Bragg grating which is arranged on the optical fiber and which alters radiation conducted by the optical fiber, the alteration being dependent on the temperature of the wall.

8. The device according to claim 7, wherein the sensitive element comprises two Bragg gratings flanking a resonant cavity whose resonant wavelength is dependent on the temperature of the wall.

9. The device according to claim 1, wherein the heating element of each node comprises a second optical fiber conducting luminous radiation toward the wall to heat it.

10. The device according to claim 9, wherein the wall comprises a material which diffuses the luminous radiation emitted by the second optical fiber of the heating element.

11. The device according to claim 9, wherein the wall comprises a material transparent to the luminous radiation emitted by the second optical fiber of the heating element covered with the diffusing material at the interface between the wall and the medium in which the aerodynamic stream is traveling.

12. The device according to claim 9, wherein an end of the second optical fiber of the heating element is situated in a cavity so as to illuminate a skin.

13. The device according to claim 9, wherein the second optical fiber of the heating element extends along the wall and comprises an end situated in immediate proximity to the element sensitive to the temperature of the wall.

14. The device according to claim 1, wherein at each node, the wall limits a solid body along which the aerodynamic stream travels and in that the solid body comprises a cavity closed by a skin forming the wall at the element sensitive to the temperature of the wall.

15. The device according to claim 1, wherein, for each node, the generator supplies the heating element with power as a function of a setpoint and in that the device comprises means for modulating the setpoint at a given frequency and means for demodulating the temperature measured by the element sensitive to the temperature of the wall, the demodulation being synchronous with the modulation.

16. A loop for controlling a profile of a wall, comprising a device to determine characteristics of an aerodynamic stream along the wall, the device comprising:
    a plurality of temperature-sensitive optical nodes distributed along an optical fiber, each node comprising an element heating the wall and an element sensitive to the temperature of the wall;
    a generator supplying power to the heating element of each of the nodes; and
    processing means configured to:
        determine for each node variations in speed of the aerodynamic stream as a function of power emitted by the generator to supply the heating element and of a temperature measured by the sensitive element,
        differentiate temporal and spatial characteristics of the speed variations of the stream at the various nodes, and compare the temporal and spatial characteristics with predefined data in order to determine characteristics of the aerodynamic stream, the loop further comprising at least one electric or fluidic actuator to modify the profile of the wall as a function of the temporal and spatial characteristics of the speed variations of the stream at the various nodes to modify these variations.

\* \* \* \* \*